(12) United States Patent
Steinberg et al.

(10) Patent No.: US 7,590,305 B2
(45) Date of Patent: *Sep. 15, 2009

(54) DIGITAL CAMERA WITH BUILT-IN LENS CALIBRATION TABLE

(75) Inventors: Eran Steinberg, San Francisco, CA (US); Yury Prilutsky, San Mateo, CA (US); Peter Corcoran, Clargalway (IE); Adrian Zamfir, Bucuresti (RO); Petronel Bigioi, Galway (IE)

(73) Assignee: FotoNation Vision Limited, Galway (IE)

( * ) Notice: Subject to any disclaimer, the term of this patent is extended or adjusted under 35 U.S.C. 154(b) by 806 days.

This patent is subject to a terminal disclaimer.

(21) Appl. No.: 10/842,244

(22) Filed: May 10, 2004

(65) Prior Publication Data

US 2005/0068452 A1    Mar. 31, 2005

Related U.S. Application Data

(63) Continuation-in-part of application No. 10/676,820, filed on Sep. 30, 2003.

(51) Int. Cl.
*H04N 5/225* (2006.01)
(52) U.S. Cl. .................................. 382/275; 348/335
(58) Field of Classification Search ................. 348/335; 382/275
See application file for complete search history.

(56) References Cited

U.S. PATENT DOCUMENTS

| 3,541,941 A | 11/1970 | Denzil et al. |
| 3,621,136 A | 11/1971 | Stanwood |
| 4,186,301 A | 1/1980 | Basire et al. |
| 4,354,204 A | 10/1982 | Kimura |
| 4,748,509 A | 5/1988 | Otake et al. |
| 5,065,257 A | 11/1991 | Yamada |
| 5,093,716 A | 3/1992 | Kondo et al. |
| 5,214,470 A | 5/1993 | Denber |
| 5,216,504 A | 6/1993 | Webb et al. |
| 5,315,538 A | 5/1994 | Borrell et al. |
| 5,416,516 A | 5/1995 | Kameyama et al. |
| 5,436,979 A | 7/1995 | Gray et al. |
| 5,475,429 A | 12/1995 | Kodama |
| 5,485,534 A | 1/1996 | Takemoto et al. |
| 5,526,446 A | 6/1996 | Adelson et al. |
| 5,541,655 A | 7/1996 | Kaneda |

(Continued)

FOREIGN PATENT DOCUMENTS

EP    1157544 A1    8/2000

(Continued)

OTHER PUBLICATIONS

Patent Abstract of Japan, publication No. 2000050062, Image Input Device, publication date Feb. 18, 2000, 1 page.

(Continued)

*Primary Examiner*—Charles Kim
*Assistant Examiner*—John W Lee
(74) *Attorney, Agent, or Firm*—Andrew V. Smith

(57) ABSTRACT

A digital camera that automatically corrects dust artifact regions within acquired images by compiling a dust map includes an optical system for acquiring an image with a corresponding dust calibration table for such optical system, including a lens assembly and an aperture stop, in which the corresponding dust calibration map can reside. A transformation between the dust map and the specific lens calibration table, enables the use for a single dust map in multiple instances of lenses and focal length, without the need to recalibrate the digital camera for each instance.

22 Claims, 9 Drawing Sheets

U.S. PATENT DOCUMENTS

| | | | |
|---|---|---|---|
| 5,557,689 | A | 9/1996 | Huttenlocher et al. |
| 5,576,715 | A | 11/1996 | Litton et al. |
| 5,625,413 | A | 4/1997 | Katoh et al. |
| 5,643,699 | A | 7/1997 | Waldner |
| 5,873,830 | A | 2/1999 | Hossack et al. |
| 5,926,291 | A | 7/1999 | Haraguchi et al. |
| 5,965,896 | A | 10/1999 | Marton |
| 5,969,372 | A | 10/1999 | Stavely et al. |
| 5,974,194 | A | 10/1999 | Hirani et al. |
| 5,982,941 | A | 11/1999 | Loveridge et al. |
| 6,002,436 | A | 12/1999 | Anderson |
| 6,018,363 | A | 1/2000 | Horii |
| 6,035,072 | A | 3/2000 | Read |
| 6,035,073 | A | 3/2000 | Kaup |
| 6,094,511 | A | 7/2000 | Metcalfe et al. |
| 6,097,847 | A | 8/2000 | Inoue |
| 6,125,213 | A | 9/2000 | Morimoto |
| 6,167,206 | A | 12/2000 | Hylen |
| 6,181,378 | B1 | 1/2001 | Horie et al. |
| 6,192,161 | B1 | 2/2001 | Kondo et al. |
| 6,233,364 | B1 | 5/2001 | Krainiouk et al. |
| 6,266,054 | B1 | 7/2001 | Lawton et al. |
| 6,323,855 | B1 | 11/2001 | Hamilton, Jr. et al. |
| 6,326,998 | B1 | 12/2001 | Palum |
| 6,329,826 | B1 | 12/2001 | Shinada et al. |
| 6,344,640 | B1 | 2/2002 | Rhoads |
| 6,381,357 | B1 | 4/2002 | Tan et al. |
| 6,465,801 | B1 | 10/2002 | Gann et al. |
| 6,487,321 | B1 | 11/2002 | Edgar et al. |
| 6,563,945 | B2 | 5/2003 | Holm |
| 6,567,116 | B1 | 5/2003 | Aman et al. |
| 6,587,592 | B2 | 7/2003 | Georgiev et al. |
| 6,636,646 | B1 | 10/2003 | Gindele |
| 6,690,816 | B2 | 2/2004 | Aylward et al. |
| 6,700,667 | B2 | 3/2004 | Nishi |
| 6,707,950 | B1 | 3/2004 | Burns et al. |
| 6,733,136 | B2 | 5/2004 | Lantz et al. |
| 6,792,161 | B1 | 9/2004 | Imaizumi et al. |
| 6,829,008 | B1 | 12/2004 | Kondo et al. |
| 6,842,196 | B1 | 1/2005 | Swift et al. |
| 6,874,420 | B2 | 4/2005 | Lewis, Jr. et al. |
| 6,895,109 | B1 | 5/2005 | Schemmel et al. |
| 6,919,892 | B1 | 7/2005 | Cheiky et al. |
| 6,933,978 | B1 | 8/2005 | Suda |
| 6,940,545 | B1 | 9/2005 | Ray et al. |
| 6,940,550 | B2 | 9/2005 | Kitawaki et al. |
| 7,003,136 | B1 | 2/2006 | Harville |
| 7,020,350 | B2 | 3/2006 | Sakai et al. |
| 7,058,294 | B2 | 6/2006 | Nakahara |
| 7,061,648 | B2 * | 6/2006 | Nakajima et al. ............ 358/1.9 |
| 7,149,262 | B1 | 12/2006 | Nayar et al. |
| 7,206,461 | B2 | 4/2007 | Steinberg et al. |
| 7,308,156 | B2 | 12/2007 | Steinberg et al. |
| 7,310,450 | B2 | 12/2007 | Steinberg et al. |
| 7,315,658 | B2 | 1/2008 | Steinberg et al. |
| 7,340,109 | B2 | 3/2008 | Steinberg et al. |
| 7,369,712 | B2 | 5/2008 | Steinberg et al. |
| 7,424,170 | B2 | 9/2008 | Steinberg et al. |
| 2001/0035491 | A1 | 11/2001 | Ochiai et al. |
| 2001/0039804 | A1 | 11/2001 | Newman et al. |
| 2001/0041018 | A1 | 11/2001 | Sonoda |
| 2002/0041383 | A1 | 4/2002 | Lewis, Jr. et al. |
| 2002/0093577 | A1 * | 7/2002 | Kitawaki et al. ............ 348/241 |
| 2002/0154831 | A1 | 10/2002 | Hansen et al. |
| 2002/0158192 | A1 | 10/2002 | Gann |
| 2002/0158977 | A1 | 10/2002 | Hamilton |
| 2002/0195577 | A1 | 12/2002 | Gann et al. |
| 2003/0025802 | A1 | 2/2003 | Mayer et al. |
| 2003/0036860 | A1 | 2/2003 | Rice et al. |
| 2003/0039402 | A1 | 2/2003 | Robins et al. |
| 2003/0098922 | A1 | 5/2003 | Barkan |
| 2003/0118249 | A1 | 6/2003 | Edgar |
| 2003/0133027 | A1 | 7/2003 | Itoh |
| 2003/0174902 | A1 | 9/2003 | Barkan |
| 2003/0174982 | A1 | 9/2003 | Ridgway et al. |
| 2003/0193604 | A1 | 10/2003 | Robins et al. |
| 2004/0037457 | A1 | 2/2004 | Wengender et al. |
| 2004/0201709 | A1 | 10/2004 | McIntyre et al. |
| 2005/0001910 | A1 | 1/2005 | Hoshuyama et al. |
| 2005/0068445 | A1 | 3/2005 | Steinberg et al. |
| 2005/0068446 | A1 | 3/2005 | Steinberg et al. |
| 2005/0068447 | A1 | 3/2005 | Steinberg et al. |
| 2005/0068448 | A1 | 3/2005 | Steinberg et al. |
| 2005/0068449 | A1 | 3/2005 | Steinberg et al. |
| 2005/0068450 | A1 | 3/2005 | Steinberg et al. |
| 2005/0068451 | A1 | 3/2005 | Steinberg et al. |
| 2005/0068452 | A1 | 3/2005 | Steinberg et al. |
| 2005/0078173 | A1 | 4/2005 | Steinberg et al. |
| 2006/0221227 | A1 | 10/2006 | Chang |
| 2006/0274171 | A1 | 12/2006 | Wang |
| 2007/0095482 | A1 | 5/2007 | Benton |
| 2007/0116380 | A1 | 5/2007 | Ciuc et al. |
| 2007/0122056 | A1 | 5/2007 | Steinberg et al. |
| 2007/0189757 | A1 | 8/2007 | Steinberg et al. |
| 2007/0253638 | A1 | 11/2007 | Steinberg et al. |
| 2008/0055433 | A1 | 3/2008 | Steinberg et al. |
| 2008/0144965 | A1 | 6/2008 | Steinberg et al. |
| 2008/0144966 | A1 | 6/2008 | Steinberg et al. |
| 2008/0152255 | A1 | 6/2008 | Steinberg et al. |
| 2008/0240555 | A1 | 10/2008 | Nanu et al. |

FOREIGN PATENT DOCUMENTS

| | | |
|---|---|---|
| EP | 1188309 A1 | 11/2000 |
| EP | 1478169 A2 | 11/2004 |
| EP | 1507157 A2 | 2/2005 |
| EP | 1478169 A3 | 3/2006 |
| JP | 4-221748 A | 8/1992 |
| JP | 2000-050062 A | 2/2000 |
| WO | 03/019473 A1 * | 3/2003 |
| WO | WO 03/019473 A1 | 3/2003 |
| WO | 2005/041558 A1 | 5/2005 |
| WO | 2005/109853 A1 | 11/2005 |
| WO | 2007/095483 A2 | 8/2007 |

OTHER PUBLICATIONS

PCT Notification of Transmittal of the International Search Report and the Written Opinion of the International Searching Authority, or the Declaration, for PCT/EP2004/010199, paper dated Dec. 13, 2004, 13 pages.

Written Opinion of the International Search Authority, for PCT Application No. PCT/EP2004/010199, paper dated Apr. 3, 2006, 6 pages.

International Preliminary Report on Patentability, for PCT Application No. PCT/EP2004/010199, paper dated Dec. 9, 2004, 6 pages.

EPO Invitation Pursuant to Article 96(2) and Rule 51(2) EPC, for Application No. 04765121.1, dated May 7, 2007, 4 Pages.

Patent Abstracts of Japan vol. 2000, No. 05, Sep. 14, 2000 & JP 2000 050062 A (Minolta Co Ltd), Feb. 18, 2000 & US 6 792 161 B1 (Hashimoto Keisuke et al) Sep. 14, 2004.

Doignon, C.; Cortelazzo, G.; Frezza, R., A robust camera calibration technique for high resolution image acquisition, Proceedings of the European Conference on Multimedia Applications, Services and Techniques, May 28-30, 1996, Louvain la Neuve, Belgium. vol. 1, pp. 267-278.

R Domõnguez-Castro, S Espejo, A Rodrõguez, A Programmable Mixed-Signal Focal-Plane Array Processor with On-Chip Binary Imaging and Instructions Storage, IEEE Journal of Solid-State Circuits, vol. 32, No. 7, Jul. 1997. http://citeseer.ist.psu.edu/280486.html.

Forchheimer, R. Astrom, A., Near-sensor image processing: a new paradigm, IEEE Transactions on Image Processing, Nov. 1994, vol. 3, Issue 6, pp. 736-746. ISSN: 1057-7149. Digital Object Identifier: 10.1109/83.336244. http://ieeexplore.ieee.org/xpl/freeabs_all.jsp?arnumber=336244.

S. Mann, R.W. Picard, On Being 'Undigital' With Digital Cameras: Extending dynamic Range by Combining Differently Exposed Pictures, p. 7 pages. http://www.eyetap.org/wearcomp/is_t95_myversion.ps.gz.

Non-Final Office Action mailed Apr. 16, 2007, for U.S. Appl. No. 10/676,845, filed Sep. 30, 2003.

Non-Final Office Action mailed Apr. 16, 2007, for U.S. Appl. No. 10/677,134, filed Sep. 30, 2003.

Non-Final Office Action mailed Feb. 9, 2007, for U.S. Appl. No. 10/676,716, filed Sep. 30, 2003.

Non-Final Office Action mailed Feb. 9, 2007, for U.S. Appl. No. 10/676,823, filed Sep. 30, 2003.

Non-Final Office Action mailed Jul. 23, 2007, for U.S. Appl. No. 11/673,577, filed Feb. 10, 2007.

Non-Final Office Action mailed Jun. 14, 2007, for U.S. Appl. No. 10/677,139, filed Sep. 30, 2003.

Non-Final Office Action mailed Jun. 14, 2007, for U.S. Appl. No. 10/677,140, filed Sep. 30, 2003.

U.S. Appl. No. 11/462,035, filed Aug. 2, 2006.

* cited by examiner

DIGITAL CAMERA WITH BUILT-IN LENS CALIBRATION TABLE

CROSS-REFERENCE TO RELATED APPLICATIONS

This application is a continuation in part for application Ser. No. 10/676,820, filed on Sep. 30, 2003, entitled, "Determination Of Need To Service A Camera Based On Detection of Blemishes in Digital Images", which is related to a family of patent applications filed on the same day, including U.S. application Ser. No. 10/676,823, entitled, "Automated Statistical Self-Calibrating Detection and Removal of Blemishes in Digital Images Based On Multiple Occurrences Of Dust In Images"; U.S. application Ser. No. 10/677,134, entitled, "Automated Statistical Self-Calibrating Detection and Removal of Blemishes in Digital Images Based on a Dust Map Developed From Actual Image Data"; U.S. application Ser. No. 10/677,139, entitled, "Automated Statistical Self-Calibrating Detection and Removal of Blemishes in Digital Images Dependent Upon Changes in Extracted Parameter Values"; U.S. application Ser. No. 10/677,140, entitled, "Automated Statistical Self-Calibrating Detection and Removal of Blemishes in Digital Images Based on Determining Probabilities Based On Image Analysis Of Single Images"; U.S. application Ser. No. 10/676,845, entitled, "Method Of Detecting and Correcting Dust in Digital Images Based On Aura And Shadow Region Analysis"; U.S. application Ser. No. 10/676,716, entitled, "Digital Camera"; and U.S. application Ser. No. 10/676,835, entitled, "Digital Image Acquisition And Processing System", which are all hereby incorporated by reference.

BACKGROUND

1. Field of the Invention

This invention related to digital photography and in particular, automated means of in-camera removal of blemish artifacts from images captured and digitized in a digital process.

2. Description of the Related Art

Many problems are caused by dust in particular and blemishes in general on imaging devices in general and digital imaging devices in particular. In the past, two distinct forms of image processing included providing means to detect and locate dust, scratches or similar defects and providing means to remedy the distortions caused by the defects to an image. It is desired to have an advantageous system that combines these functions, and can automatically detect and correct for the effects of dust, scratches and other optical blemishes.

Image correction has been studied in relation to display devices, output apparatuses such as printers, and digital sensors. Image correction of dust artifacts can be used to recreate missing data, also referred to as in-painting or restoration, or undoing degradation of data, which still remains in the image, also referred to as image enhancement. It is desired to have a system including a digital camera and an external device or apparatus that can facilitate a defect detection and/or correction process involving sophisticated and automated computerized programming techniques.

The manifestation of the dust in a digital image is a function of several optical parameters representing the dust. It is desired to create a system that can automatically take into account changes in such parameters without the need to manually recalibrate the camera system.

SUMMARY OF THE INVENTION

A digital camera is provided that automatically corrects dust artifact regions within acquired images by compiling a statistical dust map from multiple images acquired under different image acquisition conditions. An optical system that acquires an image includes a lens assembly and an aperture stop. The optical system may include the lens specific calibration information in the lens. An electronic sensor array is disposed approximately at an image focal plane of the optical system for collecting image data according to spectral information associated with multiple pixels that collectively correspond to the image. Digital processing electronics include a processor for converting the image data to digital data and processing the digital data according to programming instructions. A memory has programming instructions stored therein for performing a method of automatic image correction of dust defect regions.

The specific dust map can be converted between different lenses and between different focal lens setting of the same lens, using a numerical formulae. By doing so, only a single dust map needs to be maintained.

The further digitally-acquired images may include different images than the originally acquired images. The method may further include correcting pixels corresponding to correlated dust artifact regions within each of the original images based on the associated statistical dust map. The method may include correcting pixels corresponding to correlated dust artifact regions within the original images based on the associated statistical dust map. The method may include digitally-acquiring additional images with the digital camera, repeating the determining and associating, and updating the statistical dust map including updating the mapped dust regions based on the additional dust artifact determining and associating.

The image correction method may be performed on a processed image after being converted from raw format to a known red, green, blue representation. The correcting may include replacing pixels within the one or more digitally-acquired images with new pixels. The correcting may include enhancing the values of pixels within the one or more digitally-acquired images.

The dust artifact determining may include loading the statistical dust map, loading extracted parameter information of a present image, performing calculations within the statistical dust map having extracted parameter variable-dependencies, and comparing dust artifact detection data with the extracted parameter dependent statistical dust map data. The dust artifact determining may also include loading the statistical dust map, loading extracted parameter information of a present image, loading extracted parameters regarding the optical system, performing a calculation for relating the statistical dust map with the present image according to a selected value of an extracted parameter which is otherwise uncorrelated between the present image and the dust map, and comparing dust artifact detection data with the now correlated statistical dust map data. The suspected dust artifact regions of at least two images may include shadow regions and aura regions, and wherein the method may include a first comparison of the shadow regions and a second comparison of the aura regions.

The method may include digitally-acquiring further images with the digital camera, repeating the determining and associating, and updating the statistical dust map including updating the mapped dust regions based on the further dust artifact determining and associating. The determining may include determining probabilities that certain pixels correspond to dust artifact regions within the acquired images based at least in part on a comparison of suspected dust artifact regions within two or more digitally-acquired images, or on a pixel analysis of the suspected dust artifact regions in view of predetermined characteristics indicative of the presence of a dust artifact region, or both. The determining may be based at least in part on a comparison of suspected dust artifact regions within two or more digitally-acquired images.

The correcting may further include replacing the pixels within the one or more digitally-acquired images with new pixels. The correcting may include enhancing the values of pixels within the one or more digitally-acquired images.

BRIEF DESCRIPTION OF TABLES

Figure 1:
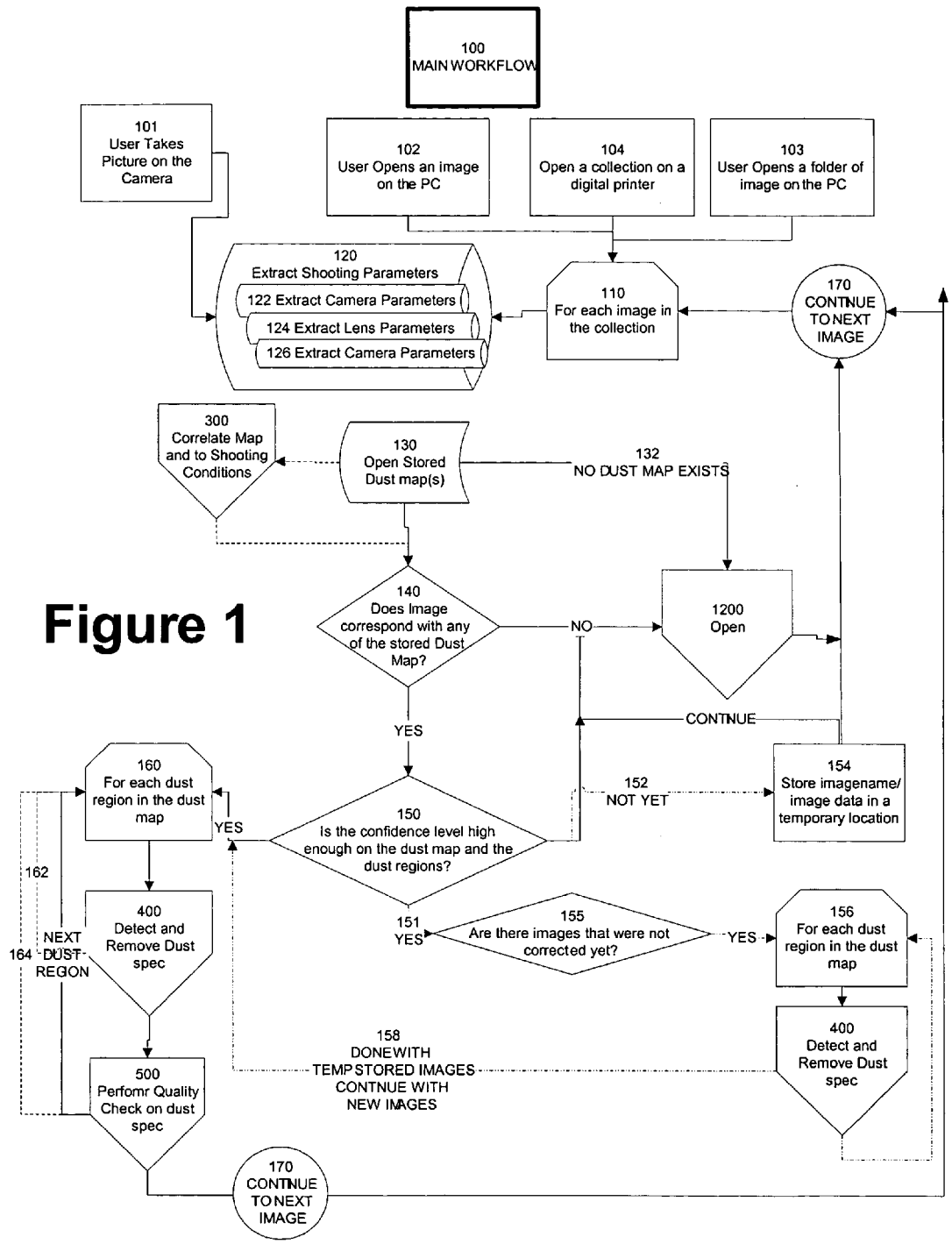
FIG. 1 illustrates a main workflow of a dust removal process in accordance with a preferred embodiment.

Table 1 lists potential Extracted Lens Parameters.

DETAILED DESCRIPTION OF THE PREFERRED EMBODIMENTS

Some Definitions

Dust specs: The preferred embodiment takes advantage of the fact that many images may have repetitive manifestation of the same defects such as dust, dead-pixels, burnt pixels, scratches etc. Collectively, for this specifications all possible defects of this nature are referred to in this application as dust-specs or dust defects. The effects of those dust specs on digital images are referred to herein as dust artifacts.

Acquisition device: the acquisition device may be a a multi-functional electronic appliance wherein one of the major functional capabilities of the appliance is that of a digital camera. Examples can be include digital camera, a hand held computer with an imaging sensor, a scanner, a hand-set phone, or another digital device with built in optics capable of acquiring images. Acquisition devices can also include film scanners with a area-capture CCDs, as contrasted, e.g., with a line scan mechanism. D-SLR: Digital Single Lens Reflex Camera. A digital camera where the viewfinder is receiving the image from the same optical system as the sensor does. Many D-SLR, as for SLR cameras have the capability to interchange its lenses, this exposing the inner regions of the camera to dust.

A few parameters are defined as part of the process:

N Number of images in a collection.

HIdp Number of images for occurrence to be high dust probability

HSdp Number of recurring specs for label a region to be high dust probability p(hsdp) Probability threshold for high confidence of a dust spec.

N dp Number of images to determine that a region is not dust p(ndp) Probability threshold to determine that a region is not a dust region.

Most likely HIdp<=HSdp

I—is a generic image

I(x,y) pixel in location x horizontal, y vertical of Image I pM is a continuous tone, or a statistical representation of a dust map dM is a binary dust map created form some thresholding of pM.

Mathematical Modeling of the Optical System

Prior to understanding the preferred embodiments described herein, it is helpful to understand the mathematical modeling of the camera optical system. This model is defined in application No. 10/676,820 filed on Sep. 30, 2003, which is incorporated by reference. With this modeling, the preferred embodiments may advantageously utilize a single dust map for dust detection and/or correction techniques rather than creating a dust map for each instance of dust artifact having its own shape and opacity depending on extracted parameters relating to the imaging acquisition process. With an ability to model the optical system and its variability, a single map may suffice for each lens or for multiple lenses, and for multiple focal lengths, multiple apertures, and/or other extracted parameters as described in more detail below. This information, which is typical to a lens and a camera combination may be stored in an external application, in the camera processing memory and or inside the lens.

The main workflow of detecting and removing the dust from an image is illustrated in FIG. 1. The preferred embodiment is activated in four different cases. In general, this preferred embodiment works for removing dust form a collection of images having the same acquisition device. Specifically, a user may acquire a picture on her digital camera (as illustrated in Block 101). Alternatively (102), a user may open a single image on a external device such as a personal computer, open (103) a folder of images on an external device or open a collection of images on a digital printing device (104).

The preferred embodiment then extracts the shooting parameters (120). Such parameters include, but not limited to data about: the generic device parameters such as Camera parameters (122) such as Camera name, Model, and conversion data specific for the camera, Lens parameters (124) such as Lens brand, lens type, lens focal length, and lens calibration tables; as well as parameters specific to the image (126) such as focal length at acquisition, aperture range, aperture at acquisition.

In addition, some parameter, in particular on the lens (126) and the camera (124) may be also stored in the device, which is the acquisition device such as the digital camera or the processing device such as the personal computer or digital printer. Such information, which may include parameters such as exit pupil, exit pupil distance regarding the lens, or distance of dust to sensor for the camera. Currently lenses store some data in the lens which can communicate this information to the camera processor. In one embodiment of this invention the specific lens calibration tables can may be stored as part of the lens assembly. By doing so, the introduction of new lenses to the market may automatically be supported with the shipping lenses.

A table with such data may look like:

TABLE 1

Extracted Lens Parameters

| Field | Example of data | Category |
|---|---|---|
| Lens Manufacturer | Nikon | lens |
| Lens Type | AF 24 mm-45 mm f2.8-f3.5 | lens |
| Focal Length | 38 mm | Acquisition data |
| Aperture | f-16 | Acquisition data |
| Dust distance | 0.156 mm | Camera data |
| Exit pupil | 19 mm | Lens data |
| Exit pupil distance | 230 mm | Lens data |

Alternatively, the information may be related to the resulting dust shift, as opposed to the theoretical parameters such as an exit pupil, of which the shift is calculated. Such can be in a form of a lookup table or a analytical formulae.

Figure 6:
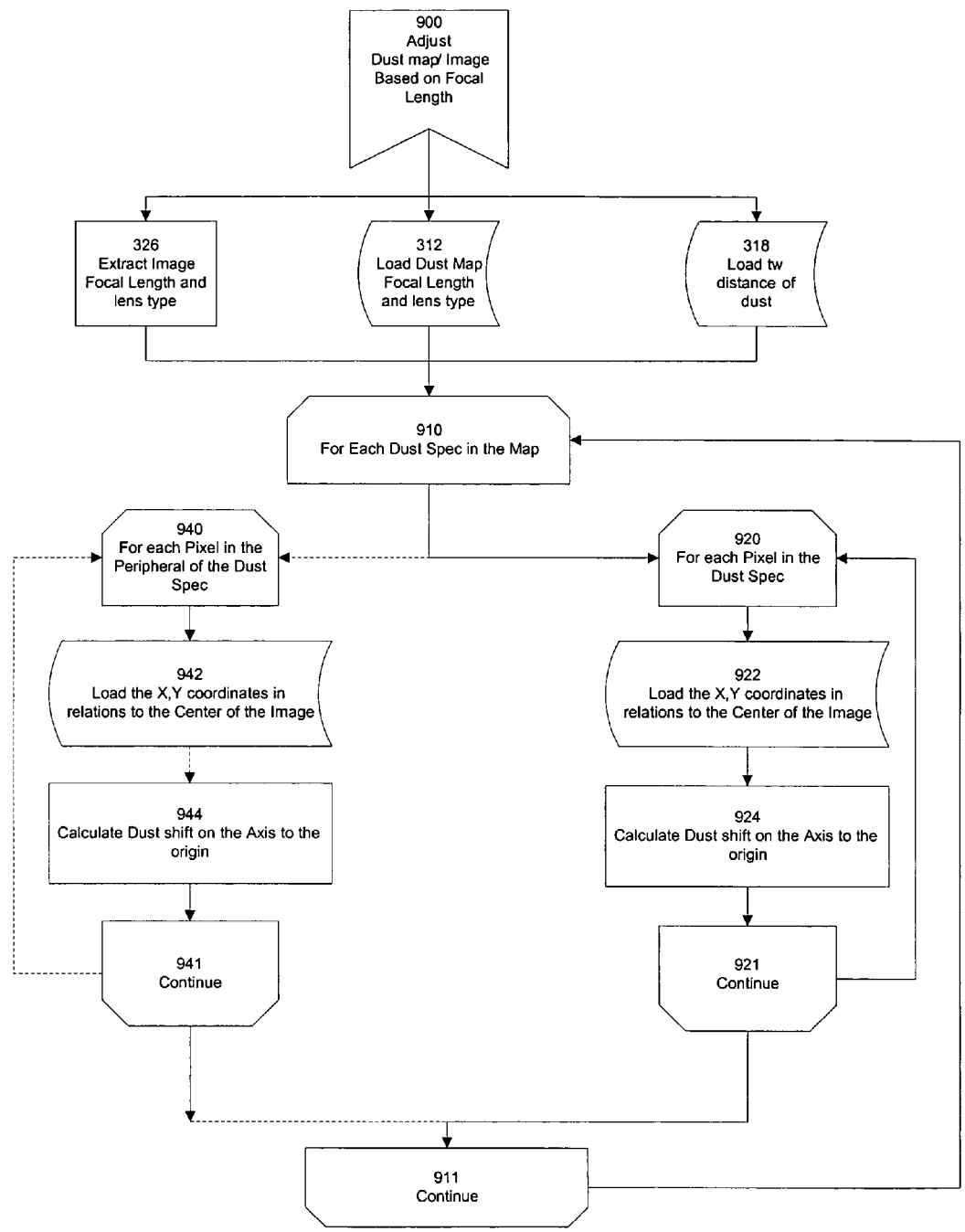
FIG. 6 illustrates an adjustment of a dust map based on focal length.
Figure 7:
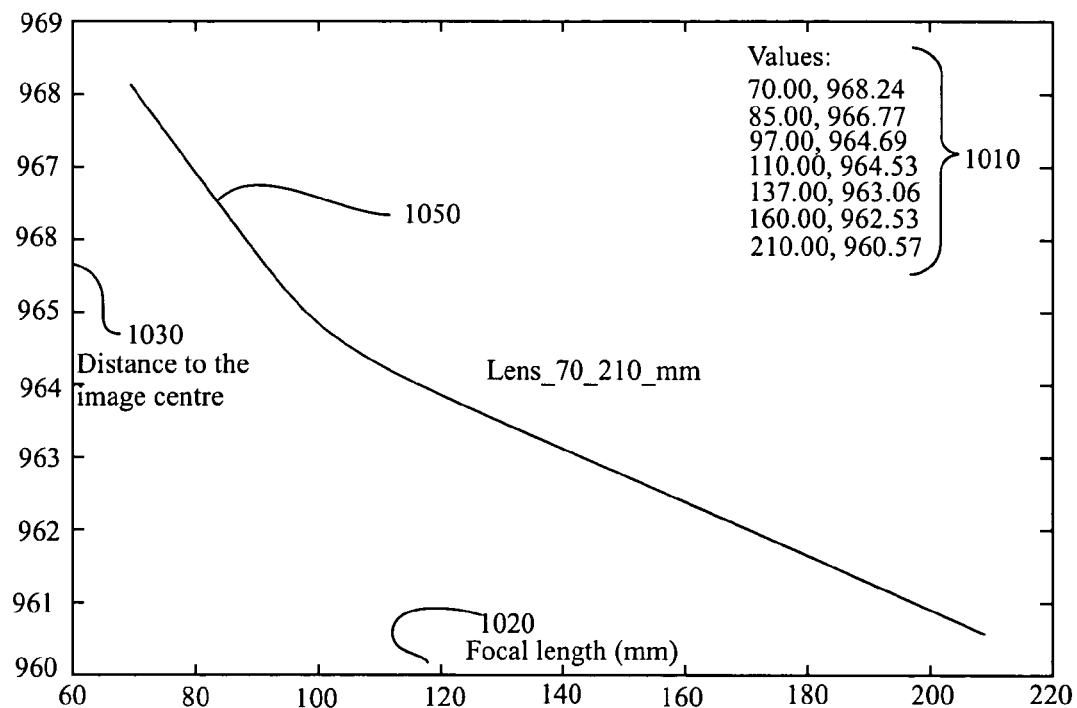
FIG. 7 illustrates the plot describing a the dust movement as a function of a lookup table for a hypothetical map.

FIG. 7 describes the graph created by such an analytical formulae or a lookup table describing the dust movement as a function of the focal length for a specific hypothetical lens. This plot describes a 70-210 mm zoom lens (1000). The interpolated values based on measured 7 points 1010. The X-axis, 1020 defines the focal length in mm of the lens. The plot describes a dust spot in a distance of roughly 960-970 away from the optical center of the lens, as illustrated in the Y-axis, 1030. As can be seen, the dust shifts as a function of the focal length. This extrapolated empirical result, 1050, corroborates the analytical explanation provided in FIG. 6. It is important to note that the plot may and is different based on the actual lens configuration and is neither predictable by the mere focal length nor is monotonicity guaranteed.

The dust map may also include meta-data that are different the list of extracted parameters. Moreover, that which is described as being extracted parameter dependent or encoded with extracted parameter value data or based on a value of an extracted parameter can be broadened to include other meta-data than just the extracted parameters listed in Table 1. For example, certain meta-data are dependent on parameters existing at the time of acquisition of the image, and can be camera-specific or not. The amount of ambient light available will depend on whether there is artificial lighting nearby or whether it is a cloudy day. Discussion of meta-data as it relates to image acquisition is found in more detail at U.S. patent application Ser. No. 10/608,810, filed Jun. 26, 2003, and is hereby incorporated by reference.

In the case that the system deals with multiple images (as defined in 102, 103, and 104), the algorithm describes a loop operation on all images (110). The first step is to open a dust map (130). If non exists (132) the system will create a new dust map (200) as further described in FIG. 2. In the case that the system has a few dust maps (130) the software will try to correlate one of the maps (300) to the image. This process is further illustrated in FIG. 3. In particular this correlation refers to the adjustment of the shooting conditions to some accepted standard. The acquisition conditions in particular refer to the aperture and the focal length. The correlation process is interchangeable and can be done by adjusting the image to the map or adjusting the map to the image. In some cases both acquired image and dust map should be adjusted to some common ground. Such an example may happen when the ma is calculated based on a aperture that the lens does not reach or a different lens than the one used wit different optical configuration. Alternatively, such as in the case of a new lens, this process (300) as called by 130, may be used to adjust the map onto a new map and from that stage onwards continue with a single map.

If no dust map corresponds with the image (140), a new dust map is created (200). When a dust map does correspond (140) to the image, the preferred embodiment checks if the dust specs as defined in the dust map are of high enough confidence level to being dust regions (150). The statistical decision as to the way such confidence level is calculated for the dust map in general and for the individual dust specs, is further discussed with reference to FIG. 2 and FIG. 3. If the confidence level is low, the image is added to the updating of the dust map (200). If after the image is added, the confidence level is high enough (152) the software continues to the dust removal process (160). Otherwise, the software progresses to the next image (170).

For example, a dust map is considered valid after 10 images are analyzed, and a dust spec is considered valid after a dust is detected in 8 images. In this case, after analyzing 9 images, the software may continue to the stage of updating the dust map (200) but upon completion (10 images) there is a valid dust map, and the software will continue to the correction (160) stage. If however the loop (110) is only on its $1^{st}$ to $8^{th}$ image, no correction will be done.

As an additional embodiment, images can be corrected retroactively after the dust map reached high enough confidence. This can be used for batch processing or off line processing or processing where the information is gathered in parallel to the needed correction. In this embodiment, when the confidence level is not enough (152, NOT-YET) the images, a pointer to them, or a list of them, or a representation of them, that were used to create the dust map are stored in temporary location (154) and when the dust map is ready (151-YES), the software will retroactively remove the dust from all those images (156). In this fashion, all images, including ones that originally did not hold sufficient statistical information, may be corrected.

Referring to the dust detection and correction process (160). This process may be executed as a loop on every dust spec in the dust map, with a stage of detection and correction (400, followed by 166 and 168). Alternatively, the process can be implemented where all dust specs are detected first (162) and then all dust specs are corrected (164). The decision as to the sequence of operations varies based on implementation criteria such as what regions of the image are in memory, and should not affect the nature of the preferred embodiment. In the case where the lens specific calibration table is in the lens, there is a need for a intermediate step which converts the dust map via those tables. By having this functionality, a single dust map may suffice to accommodate changes in lenses and changes in the focal length of a single zoom lens.

Figure 8:
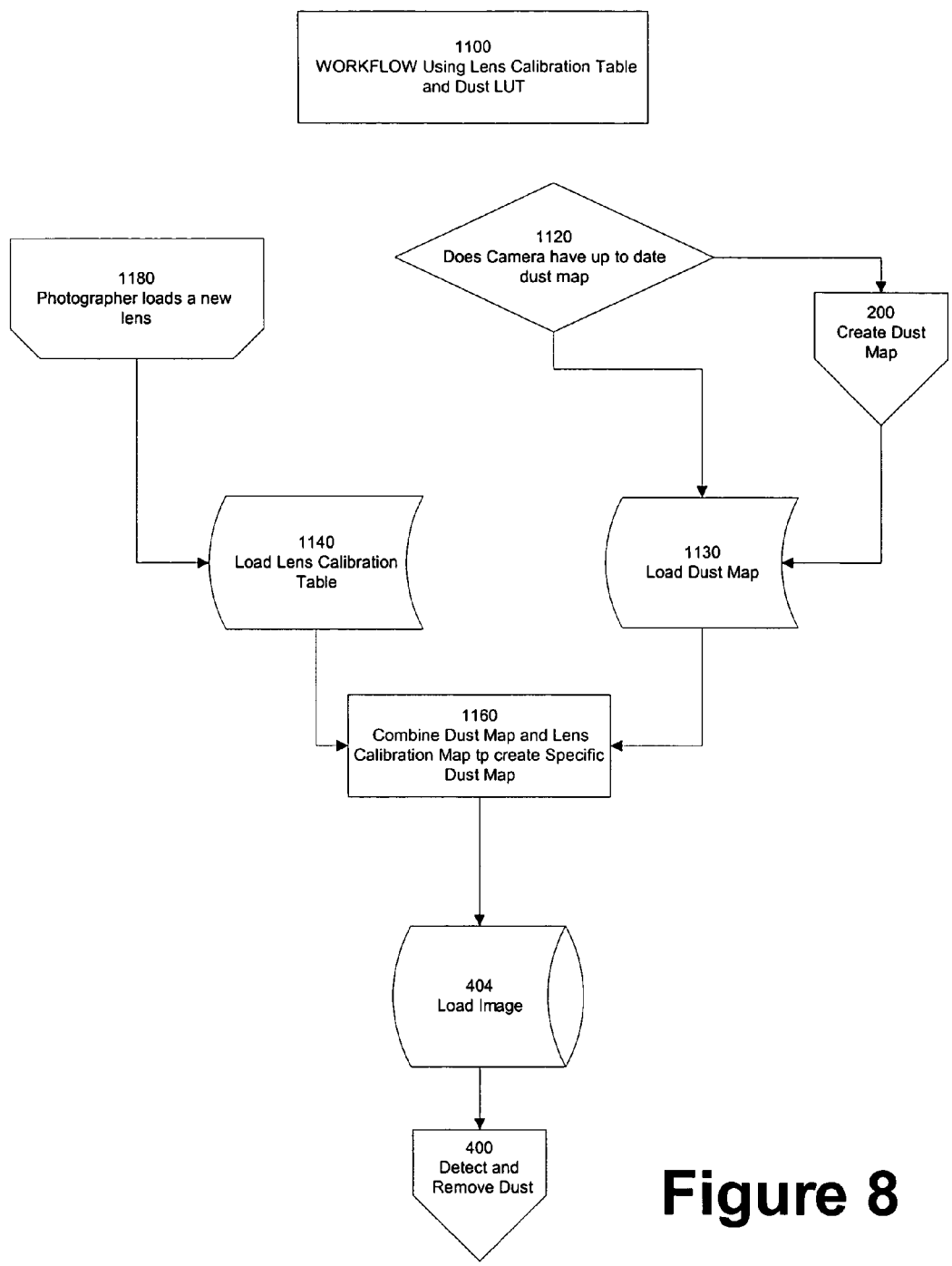
FIG. 8 describes the workflow of correcting and detecting the dust images based on a lens lookup table and a dust map.

This workflow is illustrated in FIG. 8 which describes the workflow of correcting and detecting the dust images based on a lens lookup table and a dust map. If a dust map exists (1120) the system will load the dust map (1130). Otherwise, a new dust map needs to be created as described in FIG. 2 (200). The lens calibration is then loaded (1140). Such map can exist in the software, or as part of the lens memory, or in the camera. Together with the dust map, a specific manifestation of the dust for the specific camera, lens combination is created (1160). This is the dust map that will be used to remove dust specs (400) from an image (404) that was captured using the specific lens on the specific camera. In this scenario, if a user lads a new lens, 1180, there is no need for a new calibration stage, but rather a computational step (1160) is preferred to calculate the new Specific Dust Map.

Figure 2:
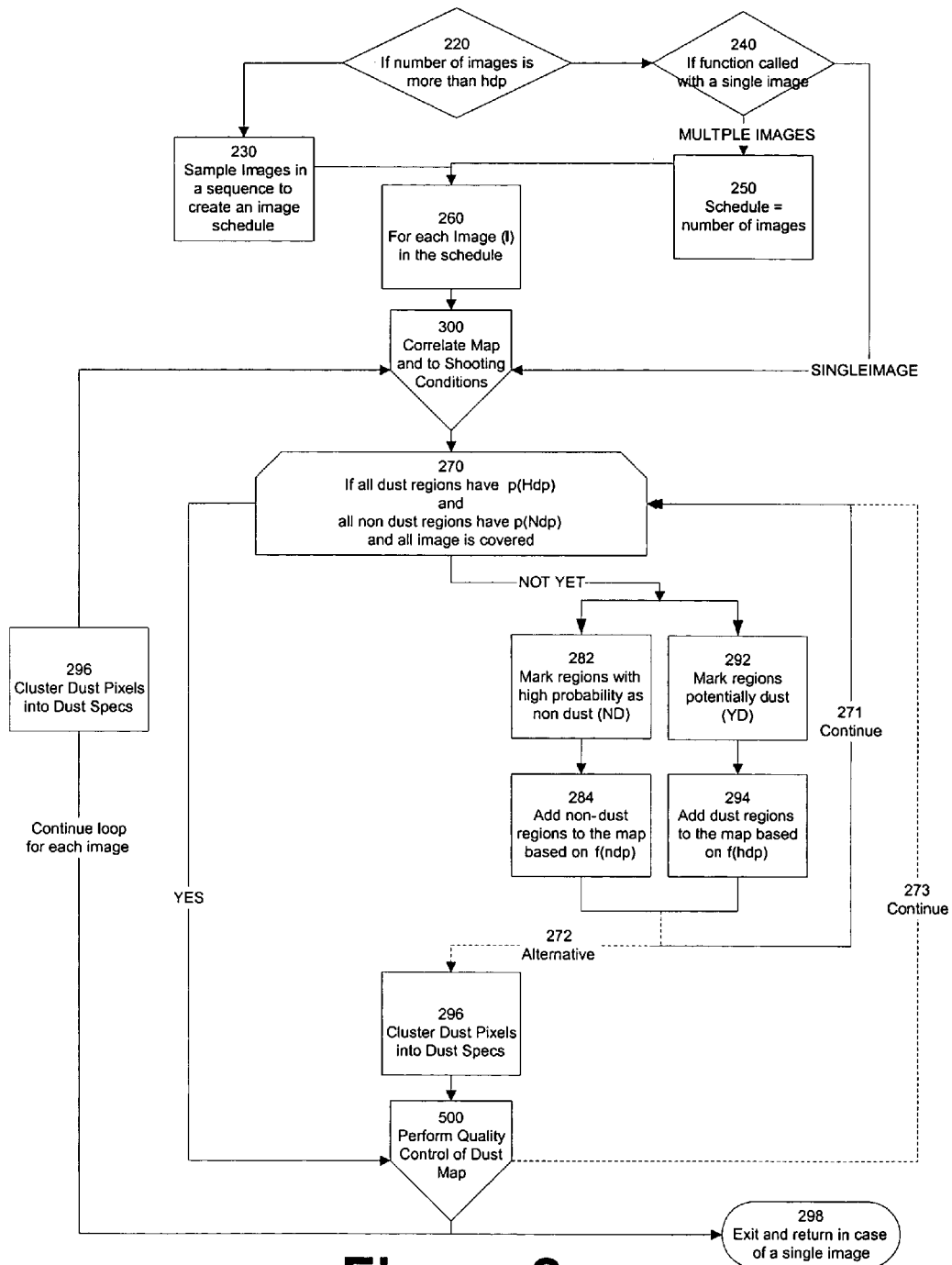
FIG. 2 illustrates the creation of a dust map.

Referring to FIG. 2 where the Dust map creation and updating is defined: this process can receive a collection of images as defined by FIG. 1. blocks 108 and 109) or one image at a time is refereed to this process, as defined by FIG. 1 block 110. If the function is called with a single image (220-SINGLE IMAGE) the image is directly provided to the calculations (270). If multiple images are provided (240 MULTIPLE IMAGES), then an initial step is to define if there are more than enough images for defining the map. This step is designed to optimize the creation process for dust in case of large amount of images.

The sequence of the images that are to be referenced based on the original collection of N images as defined in FIG. 1 blocks 102, 103 or 104. The sequence of images is based on a few criteria such as: giving more weight to images shot last, and if images are shot in a relatively small time frame, allocate the sequence is large distances to try and assure minimal repetitiveness between similar images that may have been taken of the same object with little movement. The sequence will not be limited to the number of images (HIDP) because it may well be that some regions will not have enough data in them to evaluate the dust. This may happen in cases where part of the image is very dark in some of the images.

As an example: if N (number of images in a selection)=30; and HSdp (number of images needed to determining map)= 10; and all images were shot in a space of an hour; then a potential sequence may be:

30,27,24,21,18,15,12,9,6,3,29,26,25 . . . ,2,28,25 . . . 1

Alternatively if the same 30 images were taken over a period of a month it may be beneficial to select images sequentially (last one shot is the first to be calculated):

30,29,28 . . . 20,19 . . . 2,1

And in some cases this process of sampling the series (270) may also decide not to use images that are taken too long from the last image. In this case, for example if image 1-15 were taken in July and 16-30 were taken in November, this process may limit the new map to 16-30 or even create two different maps, one for images 1-15 and the other for 16-30.

In a different criteria, the parameters as extracted from the images will determine the sequence and the number of dust maps that are to be calculated. For example if a folder contains N=30 images, where 15 were taken with one camera and 15 with another, the sampling step (270) may create two map sets.

Another criteria for creating a new set or checking for new dust is the type of lens. If a lens is changed, it means that the CCD-cavity was exposed to potential new dust. This may trigger a new set of images to be looked at. It may also be an indication that the camera was serviced, or that the photographer cleaned the camera. Of course, if there is a parameter that defines when a camera was serviced, this will trigger the creation of a new dust map.

Those familiar in the art may be able to determine the right combinations of creating this sequence based on the nature of the dust, the camera and the lens. The next loop (270-271) defines the marking of each region and the addition of the region to the dust map if it is not already there. There are three type of regions in an image, the first are images with sufficient information to detect whether they are of dust nature. As an example, dark regions surrounded by a light background. Other criteria may be regions with a relatively small color saturation. The second group are regions that are definitely non-dust. Such regions are for example all clear, or of high color saturation. Other regions are inconclusive such as a very dark segment of the image. In this case, it will be hard to detect the dust even if it was part of the image. Alternatively when looking for over exposed or "dead pixels" the criteria may be reversed, if the pixels appear as a white spec in the image.

The criteria may be also a function of the acquisition parameter. For example an image with a open aperture may all be marked as in-decisive, because the dust may not appear on the image. Regions that are potentially dust are marked (292) and then added to the dust mask (294). The addition may be the creation of a new dust spec on the map or the modification of the probability function or the confidence level counter for the region. Regions that are most likely non-dust are marked (282) and then added to the dust mask (284). The addition may be the creation of a new dust spec on the map or the modification of the probability function or the confidence level counter for the region. The additions of the regions needs to be normalized to the shooting conditions as defined by the dust map (300) if this step was not performed prior to entering this function, as optionally defined in FIG. 1.

This loop continues over all regions of the image (271). Alternatively (272), each region is compared (500) with the map dust to se if there is no case where the monotonicity is broken, i.e. a region that was of high probability to be dust is now non dust.

Figure 3:
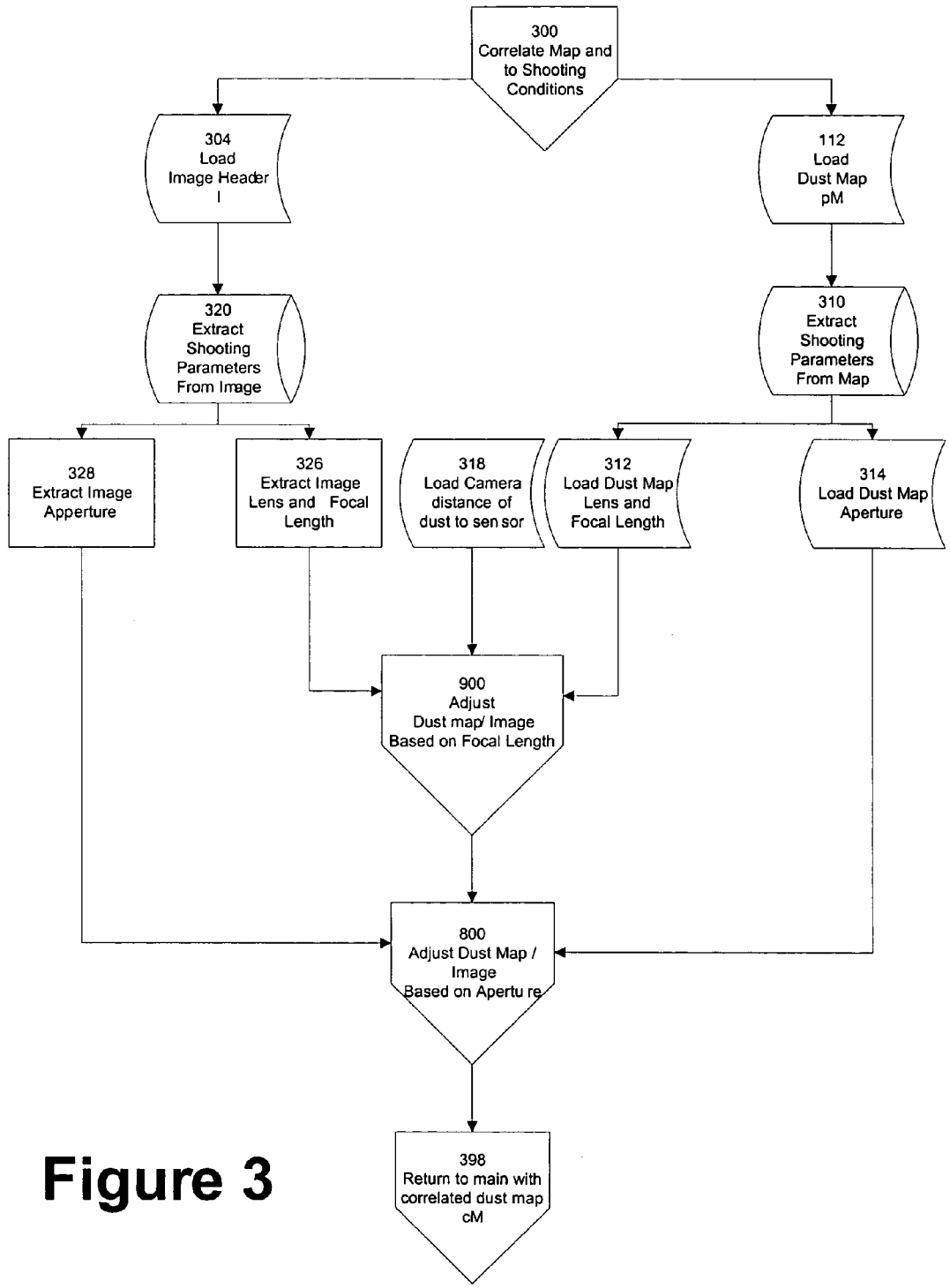
FIG. 3 outlines a correlation of a dust map to image shooting parameters.

FIG. 3 illustrates the process of correlating the image to a default settings of the dust map. This process defines correlating the image o the dust map, the dust map to a new dust map of the dust map to the mage. In particular this correlation refers to the adjustment of the shooting conditions to some accepted standard. The acquisition conditions in particular refer to the aperture and the focal length. The correlation process is interchangeable and can be done by adjusting the image to the map or adjusting the map to the image. In some cases both acquired image and dust map may be adjusted to some common ground. Such an example may happen when the ma is calculated based on a aperture that the lens does not reach or a different lens than the one used wit different optical configuration. Alternatively, in case of a new lens, this process (300) may be used to adjust the map onto a new map and from that stage onwards continue with a single map.

To begin with, the dust map is being loaded (112) and the default data on which the map was generated is extracted (310). Such data may include the lens type, the aperture and the focal length associated wit the default state. In concurrence, the information form the acquired image (304) is extracted (320) and compared to the one of the dust map.

A explained in the mathematical model of the optical system, the two main adjustments between the dust map and the image are based on focal length, and on aperture, each creating a different artifact that should be addressed. Knowledge of the phenomena may assist in creating a better detection and correction of the dust artifact. Alternatively, in a separate embodiment, analysis of the image and the modification of the dust as changed by aperture and focal length, may provide the necessary mathematical model that describes transformation that defines the changes to the dust as a function of change in the lens type, the focal length and the aperture.

Figure 5:
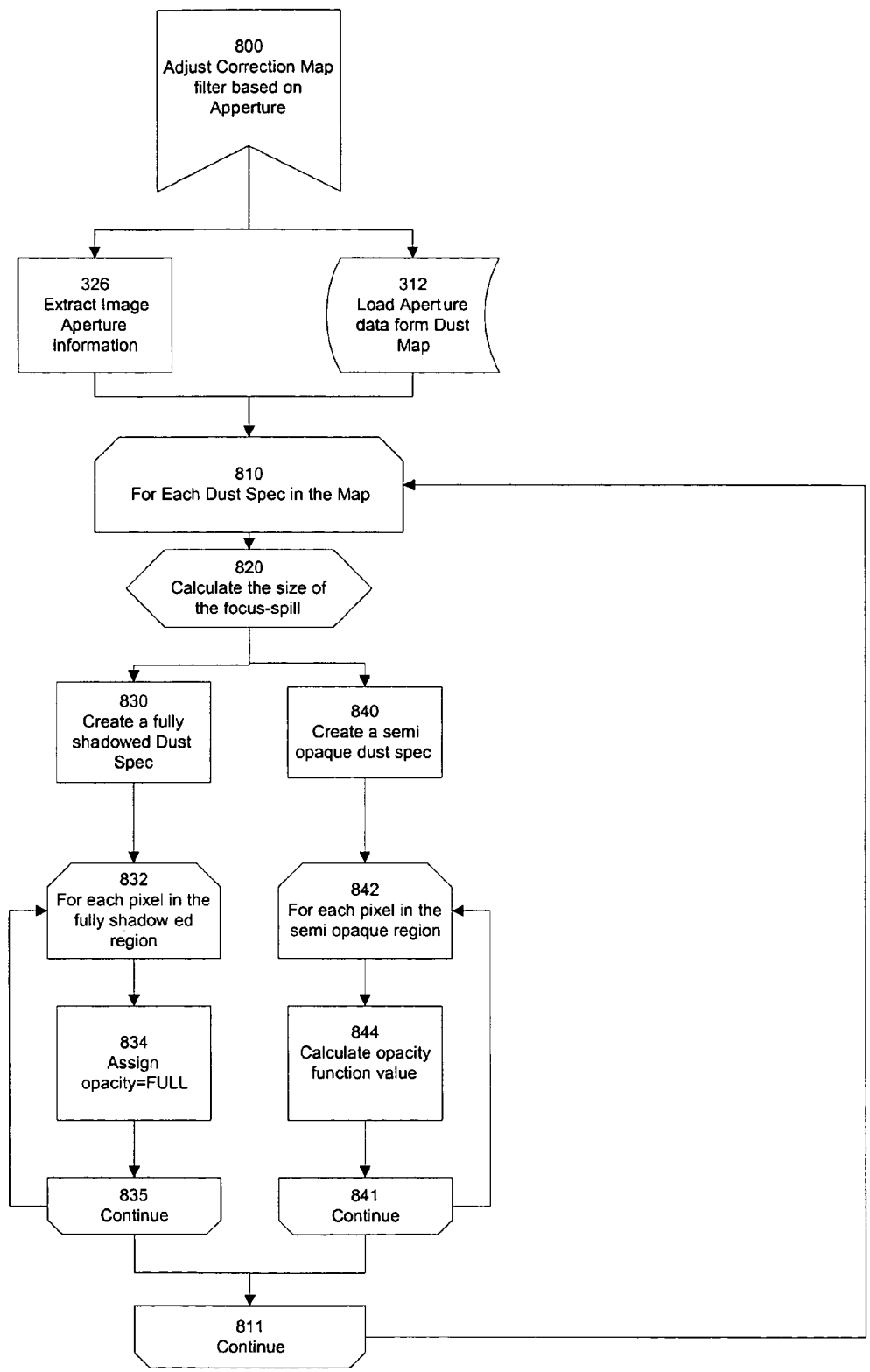
FIG. 5 illustrates an adjustment of the dust map based on aperture.

Referring to FIG. 3, after extracting the data, the following step is modification of the map and or the image based no focal length (900), and based on aperture (800). The following steps are further defined with reference to FIG. 6 and FIG. 5, respectively.

Figure 4:
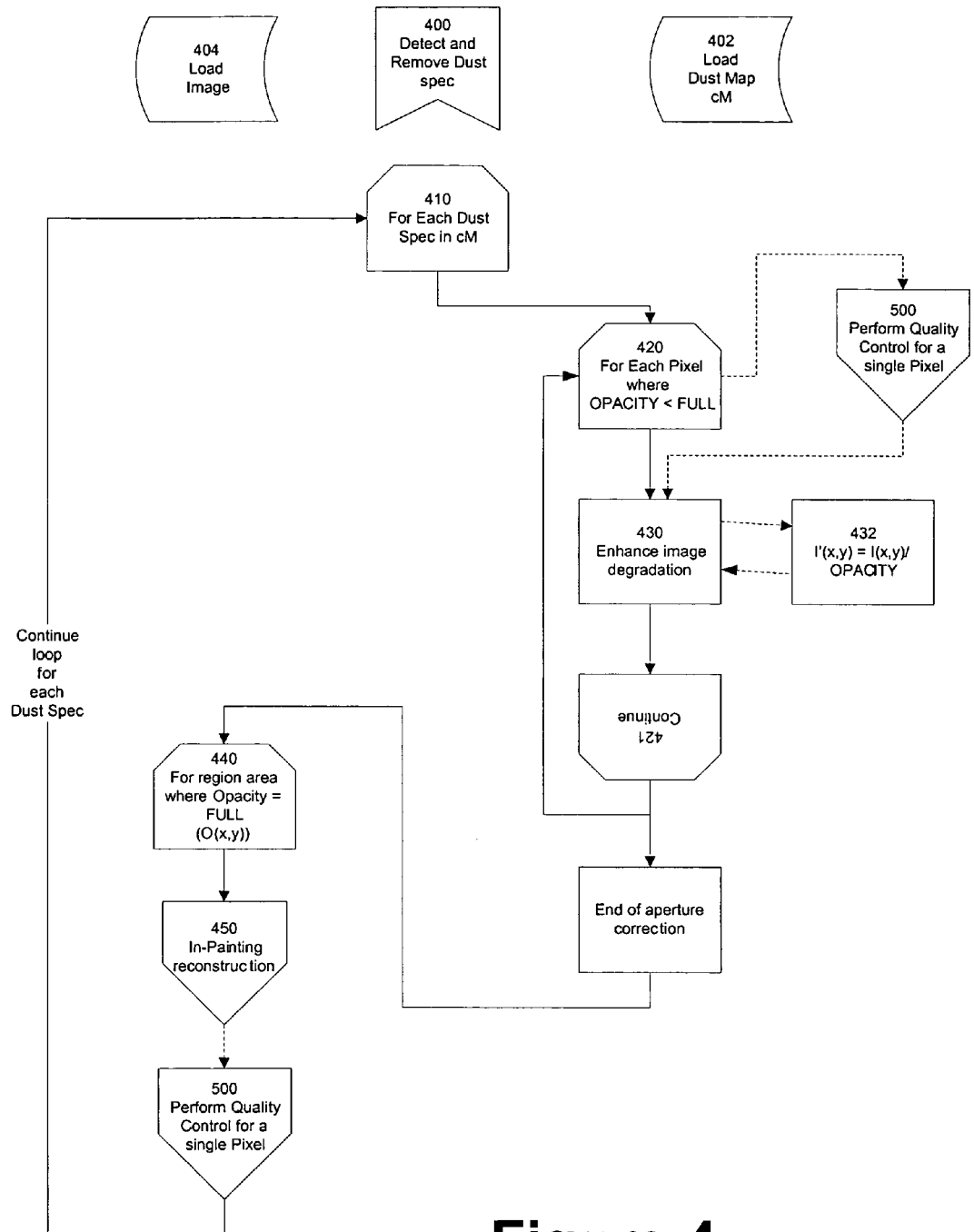
FIG. 4 illustrates a procedure for detecting and removing dust from images in accordance with a preferred embodiment.

Following the two steps (800 and 900), the Image and the Dust Map are considered to be correlated. The correlated map cM is no longer binary because it defines both the shift and the fall off which is continuous. FIG. 4 defines the preferred process of detecting and removing the dust from the image. The input is the image I is loaded, if it is not already in memory (404) and the correlated dust map is cM is loaded (402) if already not in memory.

The process of detecting and removing the dust is done per dust spec. This process is highly parallelized and can be performed as a single path over the image, or in strips. The flexibility of performing the operation on the entire image, or in portions, combined with the correlation or as a separate process, enables a flexible implementation of the algorithm based on external restrictions defined by the hardware, the run time environment, memory restrictions and processing speed.

The acquisition information and the corresponding dust map default setup are extracted in blocks 326 and 312 respectively. Then, for each dust spec in the image 810, the size of the region that is still obscured by the dust is calculated, as defined by mathematical model. In some cases, when the aperture is very open, this region may decline to 0. In others, where the aperture is still very close, the size may be close to the size of the dust. Alternatively, This step, 820, may be done as a preparation stage, and kept in a database, which can be loaded.

The process then splits in two. The fully obscured region will be marked in 834 pixel by pixel 832 in a loop 834, 835 and will be treated by the in-painting process as defined in FIG. 4. A semi opaque dust map, is created in the loop 840, 841 for each pixel. Each of the pixels 842, is assigned an OPACITY value 844, based on the mathematical model as described previously. The dust spec that is only partially attenuated will go through a inverse filtering of the information already there, as described in FIG. 4 block 430, with a specific embodiment in block 432. The process of the inverse filtering may take into account the signal to noise ratio to avoid enhancing data which is not part of the original image. For example, the region around the dust may have a overshoot similar to a high pass filter, which may manifest itself in the form of an aura around the dust. This aura should to be taken into account before enhancing the regions.

FIG. 6 describes the adjustment of the Dust Map based on the Focal length, and the specific lens. As described before, the shift of the dust spec as a function of focal length for a specific lens is a function of equation (13 the thickness of the window—tw, which is constant for a given camera and exit pupil position—Pe, which varies based on the lens system and the variable focal length in case of a zoom lens. Given an image and a dust map, the pertinent information is loaded, as described in FIG. 3, namely the focal lens and lens type of the camera, 326, the focal length and lens type in the dust map 312 and the camera distance of dust to the sensor 318.

The process then goes through all knows dust specs in the image 910 and calculates the shift of the dust. The coordinates of the pixel are calculated from the center of the optical path, 922, and the shift is calculated 924. Alternatively to going through each pixel, in order to speed the process, only the periphery of the dust spec can be calculated and the rest will be filled in. Moreover, because the shift is a function of the location (x,y) of the dust, in the case where dust is far enough from the origin, the dust shape will not change. It is then sufficient to calculate only a shift of a single point and displace the entire dust spec accordingly. The regions, which are only partially attenuated due to the change in aperture, may be calculated in this stage 940, 941, if calculated already as illustrated in FIG. 8, or alternatively, the displacement can be calculated first as explained in blocks 942,944.

In some cases, it is impossible to get the data on the exit pupil, nor the distance the dust is from the sensor. Such cases may be when the application has no a-priori knowledge of the camera or the lens that was used.

Figure 9:
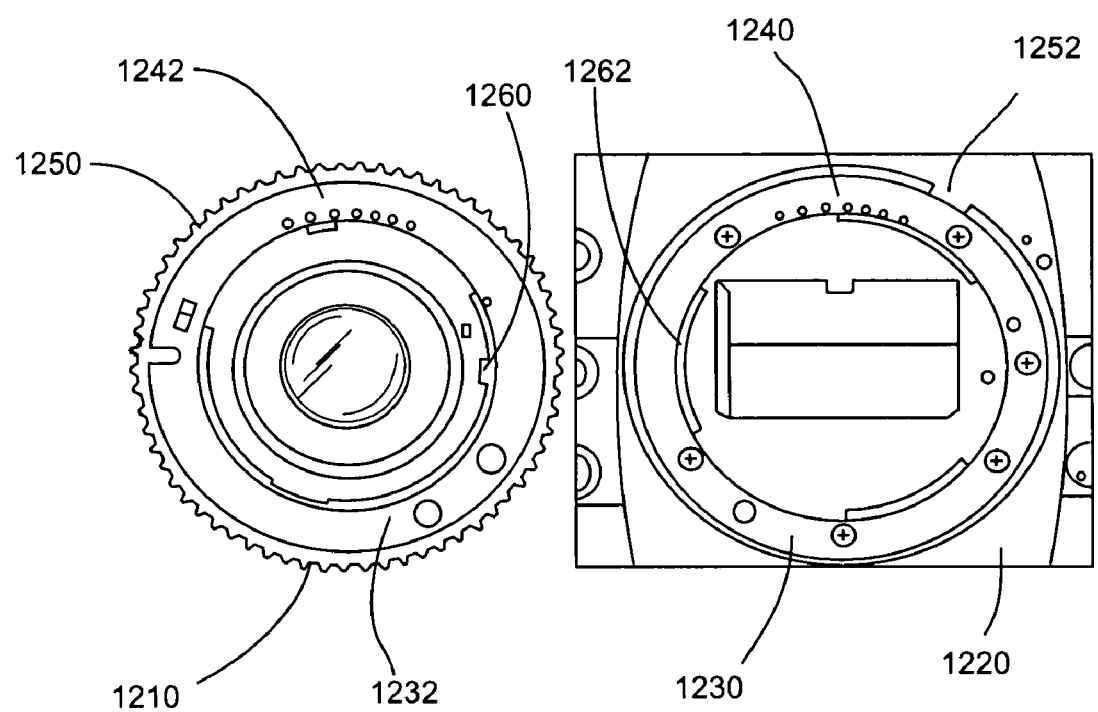
FIG. 9 schematically illustrates coupling components of a lens assembly with a housing of a digital image acquisition device.

FIG. 9 schematically illustrates coupling components of a lens assembly with a housing of a digital image acquisition device, such as a Digital Single Lens Reflex Camera, or D-SLR. The lens assembly 1310 includes various optical, mechanical, electrical and/or signal connector or coupling components for coupling with a camera housing 1320 or other digital image acquisition device housing or component. In FIG. 9, the components 1310 and 1320 are illustrated as if the lens 1310 has been uncoupled from the camera 1320 and rotated 180° about an axis running vertically within the plane of the drawing between the components 1310 and 1320.

The physical or mechanical coupling between the lens assembly 1310 and the camera body 1320 is preferably via a bayonet type mount where the grooves on the lens bayonet mount 1332 fit into the camera body mount 1330. When the lens is correctly held within the camera bayonet, electrical connectors 1342 on the back of the lens align and couple with the camera electrical connectors 1340 on the camera body. FIG. 9 also shows a further coupling component pair including a meter coupling ridge 1350 and an Ai coupling lever 1352. In addition, an aperture indexing post 1360 of the lens 1310 is shown which couples with an aperture control coupling lever 1362 of the camera 1320. Although not shown in the illustration of FIG. 9, the interface of the camera 1320 and the lens 1310 may preferably include several other coupling or related optical system components including a focal length indexing ridge and focal length indexing pin pair, a lens-type signal notch and a lens-type signal pin pair, and a lens speed indexing post and a lens speed indexing lever pair. One or more of these coupling component pairs may be including within the electrical connectors 1340, 1342, or may be otherwise disposed at the interface. Moreover, an AF coupling on the lens 1310 may be coupled with an AF coupler on the camera body 1320, e.g., in a exemplary Auto focus lens Nikkor® AF lens-type and Nikon® F4 body configuration.

Through these connectors, information may be communicated to and from the lens 1310 to the camera 1320. Such information may include details about the lens type, magnification and/or focal length. Other parameters may include aperture size or F-number. Conversely, the camera 1320 may send information to the lens 1310 such as for setting up a focus ring or otherwise initializing or calibrating with the camera 1220 or other digital image acquisition device 1220. The connectors illustrated at FIG. 13 and/or those just described above, may also serve to transfer lens calibration data relevant to dust or dust artifact within images. The lens parameter data may be entirely digitally-stored in a permanent memory of the lens assembly, and may be made accessible by a camera micro-processor upon electrical, optical or other signal coupling. This data may be in the form of analytical parameters, such as exit pupil dimension, exit pupil distance regarding the lens or distance of dust to the sensor (which may often include a thickness of a protective CCD sensor cover material, such as an anti-aliasing or an optical spacer), or other parameters, and may be a table, e.g., a look up table, describing the dust movement as a function of the focal length, etc., as discrete points, or a mathematical formula describing this relationship, or otherwise as set forth above or below herein. The lens calibration may include other data such as the effect of the aperture on the dust.

Values of extracted parameters relating to the optical system including the lens assembly may be embedded within the lens system, wherein by "embedded" it is meant that the information is stored or contained in whatever form within or on or in connection with the lens assembly. This embedded information may preferably be within a Flash or EEPROM memory chip. RAM is an alternative, but is "volatile" and would utilize a back-up battery to retain data storage when powered down. Preferably, the lens system would use the power of the camera when coupled thereto, and only alternatively would have its own separate power supply or back-up battery. In that case, the battery may be charged when coupled to the camera.

Therefore, relevant data is advantageously digitally-stored in an optical calibration table, or otherwise, within a chip or other digital storage component of the lens holder 1310, optical mount 1310 or the lens 1310 itself. The table is made accessible to a camera-resident micro-processor through the electrical or other signal connections 1340, 1342. When the lens is mechanically coupled to the camera, it is also electrically and/or optically coupled specifically so that the camera can access the table. There may be an automatic focusing that is facilitated by this communication, or other advantage involving this feature of camera-lens communication. The lens parameter data may be entirely digitally-stored in the table that is made accessible by the camera micro-processor upon coupling, although it may be made accessible by a switch that turns on the connection or by opening the shutter or by other preparation for taking a picture.

There are many alternatives to the preferred embodiments described above that may be incorporated into a image processing method, a digital camera, and/or an image processing system including a digital camera and an external image processing device that may be advantageous. For example, an electronic circuit may be designed to detect maximum and minimum dust detection probability thresholds while acquiring pixels in an image (see also U.S. Pat. No. 5,065,257 to Yamada, hereby incorporated by reference). Such a circuit can produce signals that may be used in processing to eliminate regions, which lie outside the expected range of signal values due to the presence of dust particles or similar optical defects, or alternatively to accept, maintain or eliminate regions as dust artifact regions based on whether a probability determination exceeds, high or low, a certain threshold or thresholds. A technique may be used to detect and provide a remedy for the effects of dust on a digitally-acquired image (see also U.S. Pat. No. 5,214,470 to Denber, hereby incorporated by reference). An image may be recorded within a digital camera or external processing device such as may be signal coupled with a digital camera for receiving digital output image information or a device that acquires or captures a digital image of a film image. The digital image may be compared with the film image, e.g., through a logical XOR operation, which may be used to remove dust spots or blemishes picked up in the acquisition of the digital image from the film image.

Multiple images may be processed and stationary components, which are common between images, may be detected and assigned a high probability of being a defect (see also U.S. Pat. No. 6,035,072 to Read, hereby incorporated by reference). Additional techniques, which may be employed to modify defect probability, may include median filtering, sample area detection and dynamic adjustment of scores. This dynamic defect detection process allows defect compensation, defect correction and alerting an operator of the likelihood of defects.

Dark field imaging may be employed to determine the location of defects in digital images from digital cameras or film scanners (see U.S. Pat. No. 5,969,372 to Stavely et al., and U.S. patent application 2001/0035491 to Ochiai et al., each hereby incorporated by reference). A normal imaging of a object with normal illumination may be followed by a second imaging using different wavelengths, e.g., infrared illumination. Dust, fingerprints, scratches and other optical defects are typically opaque to infrared light. Thus the second image produces an image with dark spots indicating the position of dust particles or other defects.

A process may involve changing any of a variety of extracted parameters (see elsewhere herein), angle of sensor relative to image plane, distance of image plane or sensor from dust specks (e.g., on window of sensor), etc., and imaging a same object with the digital camera. A comparison of the images reveals with enhanced probability the locations of dust artifact. In a camera application, the unique location of the actual dust relative to the object and to the image plane provide information about extracted parameter-dependent characteristics of dust artifact in the images. The analysis for the digital camera application depends on the "transmission"-based optical parameters of the system, i.e., the fact that light travels from a scene through the camera lens and onto the camera sensor, and not involving any substantial reflective effects. It is possible to make determinations as to where the dust actually is in the system by analyzing multiple images taken with different extracted parameters, e.g., on the sensor window, or in an image of an original object which itself is being images such as in film imaging.

In a scanning application, this technique can be use the face that a speck of dust will cast a shadow of a different color, geometry location, etc. with changes in extracted parameters, e.g., with a different color with increasing elongation of the shadow for each parallel row of pixels (a "rainbow" shadow, as it were). Multiple scans taken from various angles of illumination may be employed to produce an image which identifies dust defects from their shadows and the colors thereof (see U.S. Pat. No. 6,465,801 to Gann et al. and U.S. patent applications 2002/0195577 and 2002/0158192 to Gann et al, hereby incorporated by reference). A linear scanning element moves across a document (or the document is moved across the scanning element) and an image of the document is built up as a series of rows of pixels. This differs from the physical configuration of a camera in which a shutter illuminates a X-Y sensor array with a single burst of light. In both cases, though, dust may lie close to the imaging plane of the sensor.

Technique may be applied as part of a photofinishing process to eliminate blemishes on a film image obtained by a digital camera (see also U.S. patent application 2001/0041018 to Sonoda, hereby incorporated by reference). Such techniques may import previous acquired information about defects in images from a blemish detection procedure. A technique for correcting image defects from a digital image acquisition device such as a digital camera may involve repeated imaging of an object or other image, where each successive image-acquisition involves different properties or extracted parameters or meta-data related properties, such as variable angles of incidence or variable lighting or contrast parameters, and the results of these repeated scans may be combined to form a reference image from which defect corrections are made (see also U.S. patent application 2003/0118249 to Edgar, hereby incorporated by reference).

A decision on whether a defect in a image acquired by a field-based digital camera is to be corrected or not may be based on a balancing of considerations. For example, the likely damage to surrounding defect-free portions of the image may be balanced against the likelihood of successfully achieving correction of the defect.

Image processing means may be employed where the detection or correction of defects in a digital image may be based solely on analysis of the digital image, or may employ techniques directly related to the image acquisition process, or both. Anomalous image regions may be determined based on the difference between the gradient of an image at a set of grid points and the local mean of the image gradient (e.g., see U.S. Pat. No. 6,233,364 to Krainiouk et al., hereby incorporated by reference). Such technique can reduce the number of false positives in "noisy" regions of an image such as those representing leaves in a tree, or pebbles on a beach. After determining an initial defect list by this means, the technique may involve culling the list based on a one or more or a series of heuristic measures based on color, size, shape and/or visibility measures where these are designed to indicate how much an anomalous region resembles a dust fragment or a scratch.

Techniques and means to correct scratches in a digitized images may employ a binary mask to indicate regions requiring repair or noise removal, and sample and repair windows to indicate (i) the region requiring repair and/or (ii) a similar "sample" area of the image (see also U.S. Pat. No. 5,974,194 to Hirani et al., hereby incorporated by reference). Data from a sample window may be converted to a frequency domain and combined with frequency domain data of the repair window. When a low-pass filter is applied, it has the effect to remove the sharp, or high-frequency, scratch defect.

Techniques and means of detecting potential defect or "trash" regions within an image may be based on a comparison of the quadratic differential value of a pixel with a predetermined threshold value (see U.S. Pat. No. 6,125,213 to Morimoto, hereby incorporated by reference). The technique may involve correcting "trash" regions within an image by successively interpolating from the outside of the "trash" region to the inside of this region.

Techniques and means to automate the removal of narrow elongated distortions from a digital image may utilize the characteristics of image regions bordering the distortion (see also U.S. Pat. No. 6,266,054 to Lawton et al., hereby incorporated by reference). User input may be used to mark the region of the defect, or automatic defect detection may be employed according to a preferred embodiment herein, while the process of delineating the defect is also preferably also performed automatically.

Techniques and means to allow automatic alteration of defects in digital images may be based upon a defect channel having a signal proportional to defects in the digital image (see also U.S. Pat. No. 6,487,321 to Edgar et al., hereby incorporated by reference). This allows areas of strong defect to be more easily excised without causing significant damage to the area of the image surrounding the defect.

Techniques and means may be employed to generate replacement data values for an image region (see also U.S. Pat. No. 6,587,592 to Georgiev et al., hereby incorporated by reference) Image defect may be repaired as facilitated by the replacement data. Moreover, the repairing of the unwanted image region may preserves image textures within the repaired (or "healed") region of the image.

Techniques and means may be employed to detect defect pixels by applying a median filter to an image and subtracting the result from the original image to obtain a difference image (see also U.S. patent application 2003/0039402 and WIPO patent application WO-03/019473, both to Robins et al., each hereby incorporated by reference). This may be used to construct at least one defect map. Correction of suspected defect pixels may be achieved by replacing those pixel values with pixel values from the filtered image and applying a smoothing operation. User input may or may not be utilized to further mitigate the effects of uncertainty in defect identification.

Techniques and means for retouching binary image data which is to be presented on a view-screen or display apparatus may be employed to eliminate local screen defects such as dust and scratch artifacts (see also U.S. patent application 2002/0154831 to Hansen et al., hereby incorporated by reference). The production of visible moiré effects in the retouched image data may be avoided by the replacement of small areas.

A digital video camera with sensor apparatus may incorporate a defect detecting mode (see also U.S. Pat. No. 5,416,516 to Kameyama et al., hereby incorporated by reference). The locations of detected defect pixels may be retained in the memory of the camera apparatus and replacement pixel values may be interpolated by processing algorithms, which convert the sensor data into digital image pixel values. Techniques may be employed to automatically detect and compensate for defective sensor pixels within a video camera (see also U.S. Pat. No. 5,625,413 to Katoh et al., hereby incorporated by reference). The camera may perform a dark current measurement on start-up when the camera iris is closed and by raising the gain can determine pixels which exhibit abnormally high dark current values. The location of these pixels is recorded in camera memory as a LUT with associated threshold brightness values associated with each pixel depending on its dark current value; defect compensation depends on input image brightness and ambient temperature.

An image pickup apparatus, such as a digital camera, may have a detachable lens (see also U.S. patent application 2003/0133027 to Itoh, hereby incorporated by reference). The camera may incorporate a defect detecting section and a compensation section for sensor defects. Further the defect detection operation may become active when the camera lens is detached so that the user will not miss an opportunity to take a picture due to the operation of the defect detection process.

The techniques of the preferred and alternative embodiments described herein may be applied to cameras with interchangeable lens units (see also U.S. patent application Ser. No. 5,003,399 to Masayoshi et. al., hereby incorporated by reference). The camera and lens have first and second computers in the camera body and lens device, respectively, which are programmed so that, in an initial communication sequence there between after the selected lens device is mounted on the camera body, the second microcomputer transmits optical characteristic data for the respective lens device to the first microcomputer in response to a data transmission request signal from the latter.

The techniques of the preferred and alternative embodiments described herein may be applied to printers and to imaging devices such as a digital cameras which incorporate a focusing lens system. A process may be employed for detecting and mapping dust on the surface of a photographic element (see also U.S. Pat. No. 5,436,979 to Gray et al., hereby incorporated by reference). This may be applied in the context of a verification procedure to follow a cleaning process for a range of photographic elements including film negatives and slides. Statistical information may be obtained and presented to an operator to allow control of the cleaning process. Detailed location information may be also recorded and/or correction means may be also provided for dust defects on a photographic element.

Techniques and means to create a defect map for a digital camera or similar imaging device may use an all-white reference background (see also U.S. patent application 2002/0093577 to Kitawaki et al., hereby incorporated by reference). The location of any dust or scratch defects may be recorded in the memory of the imaging apparatus when the camera is in a dust detection mode and when a dust correction circuit is active any image data co-located with a defect may be corrected for the presence of dust by elimination, color correction or interpolation based on the surrounding pixels. Further, where the position of a dust defect changes with f-stop of the camera a list of dust locations corresponding to f-stop settings is pre recorded at the time of manufacturing in a LUT in the camera memory. Any effect of different focal length may be simplified to the effect of the change in dust due to magnification of the lens. In addition, techniques for dynamically obtaining a defect map based on the processing of a plurality of images may be employed with this technique.

Techniques may be also employed involving correcting for dust defects based on the geometry of said dust or of the camera. Further techniques may involve utilizing camera metadata to enhance the detection and correction processes for defects. Further techniques may involve alerting the user that the camera requires servicing due to excessive levels of dust contamination, or the fact that it is not only magnification but the actual lens that is mounted.

A method of filtering dust artifacts form an acquired digital image including multiplicity of pixels indicative of dust, the pixels forming various shapes in the image, may be employed. The method may include analyzing image information including information describing conditions under which the image was acquired and/or acquisition device-specific information. One or more regions may be determined within the digital image suspected as including dust artifact. Based at least in part on said meta-data analysis, it may be determined whether the regions are actual dust artifact.

A method may further include analyzing the images in comparison to a predetermined dust map to establish the validity of the dust over progressions of time. The method may further involve mapping the acquired image to a predetermined default acquisition condition based on a lens and camera calibration tables, as a function of the lens type and the focal length that was used at acquisition.

A method may further include mapping a dust spec as depicted in the dust map and the suspected dust specs in the acquired image based on a calculated transformation of the dust as a function of the lens and the aperture, or other extracted parameter, used to acquire the image. The actual removal of dust artifacts from an image may include a step where missing data as obscured by the dust specs is regenerated and in-painted based on analysis of the region in the image surrounding the dust spec. The actual removal of the dust artifacts from the image may also include a step where deteriorated regions primarily in the periphery of the dust spec are enhanced and restored based on knowledge of the deterioration function. The actual image retouching may include both in-painting and restoration or either one of these operations, or another image correction technique as may be understood by those skilled in the art.

A method of detecting and removing dust artifacts may be performed in the acquisition device as a post-processing stage prior to saving the image. This method may further include an analysis of the image in its raw format immediately followed by the acquisition stage. The method of detecting and removing dust artifacts can be performed on an external device as part of a download or capture process. Such external device may be a personal computer, a storage device, and archival device, a display or a printing device or other device. The method of detecting and removing dust artifacts can be performed in part in the acquisition device and the external device.

A dust detection and/or correction technique may be applied post priori to a collection of images, or individually to images as they are added to a collection. The map may be generated a priori to the introduction of an image, or dynamically and in concurrence to the introduction of new images.

The method may further include steps of providing a statistical confidence level as to the fact that a certain region is indeed part of a dust spec. The method may further provide tools to determine whether the acquisition device may benefit from some maintenance. A method may be employed that may be implemented as part of a digitization process, such as correcting defects on scanning device, whether flat bed or drum, whether for hard copy documents or for film digitization. A method may be further applied to other recurring image imperfections such as dead pixels on the sensor, burnt pixels on the sensor, scratches, etc. A method of automatically determining whether to recommend servicing a digital image acquisition system including a digital camera based on dust analysis may be advantageously employed. A method of calculating parameters of an optical system may be based on analysis of the dust.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

In addition, in methods that may be performed according to preferred embodiments herein, the operations have been described in selected typographical sequences. However, the sequences have been selected and so ordered for typographical convenience and are not intended to imply any particular order for performing the operations, unless a particular ordering is expressly provided or understood by those skilled in the art as being necessary.

Many references have been cited above herein, and in addition to that which is described as background, the invention summary, brief description of the drawings, the drawings and the abstract, these references are hereby incorporated by reference into the detailed description of the preferred embodiments, as disclosing alternative embodiments of elements or features of the preferred embodiments not otherwise set forth in detail above. A single one or a combination of two or more of these references may be consulted to obtain a variation of the preferred embodiments described in the detailed description above.

What is claimed is:

1. A digital camera that automatically corrects dust artifact regions within acquired images, comprising:
   (a) an optical system for acquiring an image including a lens assembly and an aperture stop;
   (b) an electronic sensor array for collecting image data with multiple pixels that collectively correspond to the acquired image;
   (c) a lens calibration table corresponding to said optical system that includes information describing dust location and appearance as a function of optical parameters at least including exit pupil dimension of the lens assembly, or distance of dust from a surface of the electronic sensor array that corresponds to a focal plane of the lens assembly, or both;
   (d) a master dust map describing a physical manifestation of dust artifacts on said sensor array;
   (e) a manifestation of the master dust map for a specific lens and focal length, calculated as a transformation of the master dust map based on the lens calibration table; and (f) digital processing electronics including a processor for converting processing the digital data according to programming instructions; and (g) wherein said dust artifacts are corrected for said acquired image based on the manifestation of the master dust map.

2. The camera of claim 1, wherein said lens calibration table comprises processor-readable digital code embedded within a memory component that is located inside the lens.

3. The camera of claim 1, wherein said lens calibration table is located in an external application.

4. The camera of claim 1, wherein said lens calibration table is downloadable from a server.

5. The camera of claim 1, wherein said master dust map comprises a statistical dust map.

6. The camera of claim 5, wherein additional images are digitally-acquired with said digital camera, and said statistical dust map is dynamically updated.

7. The camera of claim 6, wherein said statistical map comprises probabilities based on comparisons with suspected equivalent dust artifact regions within said additional images.

8. The camera of claim 7, wherein determining of said probabilities is based on a pixel analysis of the suspected dust artifact regions in view of predetermined characteristics indicative of the presence of a dust artifact region.

9. The camera of claim 5, wherein whether said additional digitally-acquired images have non-contradicting data that said probability that certain pixels correspond to dust artifact regions within said images is validated prior to correcting pixels corresponding to correlated dust artifact regions within said images based on the manifestation of said master statistical dust map.

10. The camera of claim 1, wherein said dust artifacts are corrected on a image from raw format.

11. The camera of claim 1, wherein said dust artifacts are corrected on a processed image after being converted from raw format to a known red, green, blue representation.

12. The camera of claim 1, wherein said dust artifacts are corrected by replacing said pixels within said one or more digitally-acquired images with new pixels.

13. The camera of claim 1, wherein said dust artifacts are corrected by enhancing values of pixels within said one or more digitally-acquired images.

14. A method performed within a digital image acquisition device including a sensor array that is coupled with a lens assembly including optical and signal coupling, the method for automatically correcting dust artifact within images acquired by the device, comprising:

(a) acquiring one or more initial digital images within said digital acquisition device;

(b) determining that certain pixels correspond to dust artifact regions within said mages;

(c) receiving through said signal coupling one or more values of one or more extracted parameters relating to the optical system that are embedded within the lens assembly at least including exit pupil dimension of the lens assembly, or distance of dust from a surface of the electronic sensor array that corresponds to a focal plane of the lens assembly, or both;

(d) based on a master dust map describing a physical manifestation of dust artifacts on the sensor array, generating manifestation of the master dust map for a specific lens and focal length, calculated as a transformation of the master dust map based on the extracted parameters; and (e) correcting pixels corresponding to correlated dust artifact regions within further digitally-acquired images based on the determining and the one or more extracted parameter values.

15. The method of claim 14, wherein said receiving further comprises receiving data based on a lens calibration table corresponding to said lens assembly that includes information describing the dust location and appearance as a function of the extracted parameters relating to the optical system.

16. The method of claim 14, wherein the one or more extracted parameters comprise magnification, lens type, or focal length, or combinations thereof.

17. The method of claim 14, wherein the correcting comprises:

(i) associating dust artifact regions with one or more values of one or more extracted parameters relating to the optical system of the digital acquisition device when the images were acquired; and (ii) forming a statistical dust map including mapped dust regions based on the dust artifact determining and associating, (iii) wherein the correcting is based on the statistical dust map.

18. The method of claim 17, wherein the correcting further comprises:

(i) loading the statistical dust map;

(ii) loading extracted parameter information of a present image;

(iii) performing calculations within the statistical dust map having extracted parameter variable-dependencies; and (iv) comparing dust artifact detection data with the extracted parameter dependent statistical dust map data.

19. A method performed within a digital image acquisition device including a sensor array that is coupled with a lens assembly including optical and signal coupling, the method for automatically correcting imaging artifacts within images acquired by the device, comprising:

(a) acquiring one or more initial digital images within said digital acquisition device;

(b) determining that certain pixels correspond to artifact regions within said images;

(c) receiving through said signal coupling data based on a lens calibration table corresponding to said lens assembly that includes information describing artifact location and appearance as a function of one or more values of one or more extracted parameters relating to the optical system that are embedded within the lens assembly at least including exit pupil dimension of the lens assembly, or distance of dust from a surface of the electronic sensor array that corresponds to a focal plane of the lens assembly, or both;

(d) based on a master dust map describing a physical manifestation of dust artifacts on the sensor array, generating a manifestation of the master dust map for a specific lens and focal length, calculated as a transformation of the master dust map based on the extracted parameters; and (e) correcting pixels corresponding to correlated artifact regions within further digitally-acquired images based on the determining and the one or more extracted parameter values.

20. The method of claim 19, wherein the one or more extracted parameters comprise magnification, lens type, or focal length, or combinations thereof.

21. The method of claim 19, wherein the correcting comprises:
   (i) associating artifact regions with one or more values of one or more extracted parameters relating to the optical system of the digital acquisition device when the images were acquired; and
   (ii) forming a statistical map including mapped artifact regions based on the artifact determining and associating,
   (iii) wherein the correcting is based on the statistical map.

22. The method of claim 21, wherein the correcting further comprises:
   (i) loading the statistical map;
   (ii) loading extracted parameter information of a present image;
   (iii) performing calculations within the statistical map having extracted parameter variable-dependencies; and
   (iv) comparing artifact detection data with the extracted parameter dependent statistical map data.

* * * * *

UNITED STATES PATENT AND TRADEMARK OFFICE
CERTIFICATE OF CORRECTION

PATENT NO. : 7,590,305 B2 Page 1 of 1
APPLICATION NO. : 10/842244
DATED : September 15, 2009
INVENTOR(S) : Steinberg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1349 days.

Signed and Sealed this

Twenty-first Day of September, 2010

David J. Kappos
*Director of the United States Patent and Trademark Office*